United States Patent [19]

Fritz et al.

[11] Patent Number: 4,637,263
[45] Date of Patent: Jan. 20, 1987

[54] MULTI-COMPONENT FORCE AND TORQUE MEASUREMENT CELL WITH STRAIN GAUGES

[75] Inventors: Harald Fritz, Waldbronn; Peter Wurll, Karlsruhe, both of Fed. Rep. of Germany

[73] Assignee: Siemens Aktiengesellschaft, Munich and Berlin, Fed. Rep. of Germany

[21] Appl. No.: 768,392

[22] Filed: Aug. 22, 1985

[30] Foreign Application Priority Data

Aug. 24, 1984 [DE] Fed. Rep. of Germany ....... 3431202

[51] Int. Cl.$^4$ ............................................. G01L 5/16
[52] U.S. Cl. ............................................. 73/862.04
[58] Field of Search ........... 73/862.04, 862.05, 862.06, 73/767, 772

[56] References Cited

U.S. PATENT DOCUMENTS

| | | |
|---|---|---|
| 3,457,493 | 7/1969 | Shoemaker et al. |
| 3,986,403 | 10/1976 | Hurd et al. |
| 4,046,005 | 9/1977 | Goroski. |
| 4,493,220 | 1/1985 | Carignan et al. ......... 73/862 DA X |

Primary Examiner—Charles A. Ruehl
Attorney, Agent, or Firm—F. W. Powers; J. L. James

[57] ABSTRACT

A multi-component force and torque measurement cell which has strain gauges connected in each branch to a constant current source forming half-bridge circuits. These are arranged on a measurement spring with defined force introduction for longitudinal and transverse forces as well as torques in the strain direction of the measurement spring. The strain gauges are subdivided into two series circuits each having half the strain gauges and one constant current source connected at both ends to each other and to the ground. The measured voltages can be tapped between sequentially corresponding connecting points of immediately adjoining strain gauges in both series circuits.

2 Claims, 3 Drawing Figures

4,637,263

MULTI-COMPONENT FORCE AND TORQUE MEASUREMENT CELL WITH STRAIN GAUGES

BACKGROUND OF THE INVENTION

This application is related to copending application Ser. No. 634,970 filed July 27, 1984 for "Strain Gauge Device For Measuring Multi-Component Forces and Torques" which is assigned to the assignee of the present application. That application discloses a multi-component force and torque measurement cell with strain gauges connected to form half-bridge circuits with a constant current source in every bridge branch. The strain gauges are designed and oriented on a measurement spring with defined force introduction for longitudinal and transverse forces and torques in reference to the measurement spring strain directions so that a clearly associated response occurs which can be assigned to the forces and torques. An adequate number of strain gauges is provided so that using the measured voltages which can be picked-off the half-bridge circuits and the standardized tensile effects of the forces and torques impacting on the respective strain gauges, an adequate number of equations can be generated to determine all forces and torques.

The patent application describes a circuit in which a large number of strain gauges wired on one end in parallel by use of a switch and two constant voltage sources can be divided into numerous half bridges. For many applications the measurement results of the half-bridge circuits should be available for processing simultaneously. This cannot be achieved with the known circuit or can only be achieved with another embodiment in which for every bridge arm there is a separate constant current source. Accordingly, it will be appreciated that it would be highly desirable to have the measurement results available for processing simultaneously.

It is an object of the present invention to provide a measurement cell wherein the measurement results are available for processing simultaneously.

It is an object of this invention to provide a circuit which can operate using only two constant current sources and hard-wired circuits without a switch.

SUMMARY OF THE INVENTION

Briefly stated, in accordance with one aspect of the invention, there is provided a multi-component force and torque measurement cell with strain gauges connected to form half-bridge circuits with a constant current source in each branch. The strain gauges are arranged and oriented on a measurement spring with a defined force introduction for longitudinal and transverse forces and torques relative to the strain directions of the measurement spring so that a clearly correlated response in reference to the forces and torques results. There are an adequate number of strain gauges so that using the measured voltage tapped at the half-bridge circuits and the standardized elongation effects of the forces or torques impacting the corresponding strain gauges, an adequate number of equations can be generated to determine all forces and torques. The strain gauges are subdivided into two series circuits each incorporating half the number of strain gauges and a constant current source which are further connected to each other at both ends and to the ground so that measured voltages can be tapped between sequentially corresponding connecting points of strain gauges immediately adjoining each other in both series circuits.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
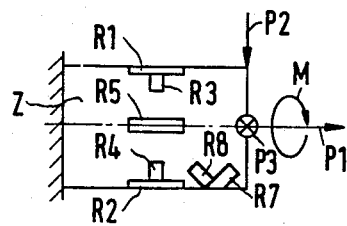
FIG. 1 is a schematic diagram of a cylindrical measurement spring with an adhering strain gauge.

FIG. 1 shows a tensioned cylindrical measurement spring Z on the left-hand side, onto which eight strain gauges are bonded. At the free end of measurement spring Z three forces P1, P2 and P3 impact. P1 acts along the axial direction of cylindrical measurement spring Z as a tensile force. P2 operates as a vertical force, and P3 as a horizontal force in the direction of the plane of projection. A torsional torque M acts on the free end of the measurement spring in the direction shown by the arrow along the longitudinal axis.

Using the measurement spring, forces operating in other directions can also be detected. These forces are broken down into their components by means of the strain gauges in terms of the indicated preferred orientation.

Figure 2:
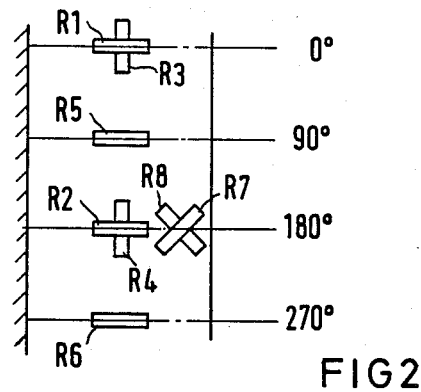
FIG. 2 shows a plane projection of the shell of the measurement spring of FIG. 1.

FIG. 2 shows a plane projection of the shell of the measurement spring in accordance with FIG. 1 with strain gauges R1 ... R8. The shell lines of measurement spring Z, on which the strain gauges are positioned, are identified by their azimuth angles.

In the following table identified as the deformation matrix, the weights are listed with which the forces and torques on the measurement spring enter the electrical resistance changes of strain gauges R1 ... R8, assuming that the scale factor of the strain gauges and the dimensional- and material-dependent form change characteristics of the measurement spring are eliminated.

| DMS | DEFORMATION MATRIX | | | |
|---|---|---|---|---|
| | P1 | P2 | P3 | M |
| R1 | +1 | +1 | 0 | 0 |
| R2 | +1 | −1 | 0 | 0 |
| R3 | −0.3 | −0.3 | 0 | 0 |
| R4 | −0.3 | +0.3 | 0 | 0 |
| R5 | +1 | 0 | +1 | 0 |
| R6 | +1 | 0 | −1 | 0 |
| R7 | +0.5 | −0.5 | 0 | +1 |
| R8 | +0.5 | −0.5 | 0 | −1 |

As can be seen, the factors for strain gauges in the axial direction on an elongated thread of the shell are +1. The value −1 applies to strain gauges which are compressed in an axial direction by the corresponding force. Strain gauges aligned transverse to the axis supply signals which are entered in the measurement with a weight of 0.3 corresponding to the Poisson constant. Strain gauges R7 and R8 oriented at 45 degrees to the axial direction supply signals in which torque M is weighted as 1 and forces P1 and P2 at 0.5. Force P3 has only a negligible impact on strain gauges R7 and R8. Torque M has a similarly negligible effect on strain gauges R1 . . . R6.

Figure 3:
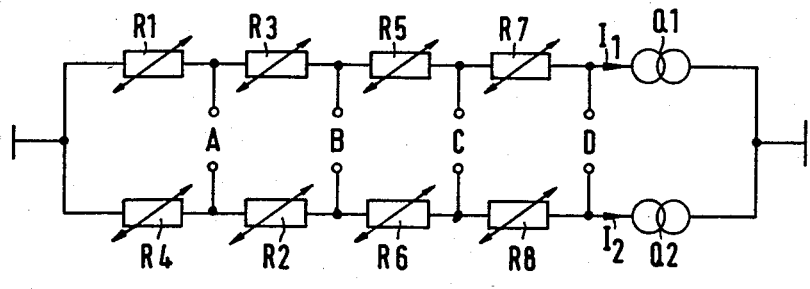
FIG. 3 shows the circuit of the strain gauges attached to the measurement spring.

FIG. 3 shows the circuit of strain gauges R1 and R8 with the two constant current sources Q1 and Q2. In the circuit branch conducting one constant current I1, strain gauges R1, R3, R5 and R7 are connected in series. In the second branch conducting constant current I2, strain gauges R4, R2, R6 and R8 are connected in series. Both ends of the series circuit are interconnected and grounded. Between sequential, corresponding connecting points of strain gauges directly adjoining each other in both series circuits, signals A, B, C and D can be picked-off using the following voltage equations:

$$A = V_{R1} - V_{R4}$$

$$B = A + V_{R3} - V_{R2}$$

$$C = A + B + V_{R5} - V_{R6}$$

$$D = A + B + C + V_{R7} - V_{R8}$$

For measurement signals A, B, C and D, the following symbolic equations also apply derived from the above voltage equations and the deformation matrix:

$$A \doteq 1.3(P1) + 0.7(P2)$$

$$B \doteq A - 1.3(P1) + 0.7(P2)$$

$$B \doteq 1.4(P2)$$

$$A - 0.7(P2) \doteq 1.3(P1)$$

$$C \doteq B + 2(P3)$$

$$C - 1.4(P2) \doteq 2(P3)$$

$$D \doteq C + 2(M1)$$

$$D \doteq 2(P3) + 1.4(P2) + 2(M1)$$

$$D - 1.4(P2) - 2(P3) \doteq 2(M1)$$

Using these equations, a computer can determine the forces impacting on the measurement spring in the respective main directions. Determination of these forces can proceed so rapidly that they can serve to control a robot which is equipped with the measurement spring as a tactile sensor.

It will now be understood that there has been disclosed a multi-component force and torque measurement cell wherein the measurement results are available for processing simultaneously. The strain gauge circuits operate using only two constant current sources and hard-wired circuits without a switch.

The high differential internal resistances of both current sources permit the currents in both branches of serially wired strain gauges to remain constant, regardless of changes of individual strain gauges in the branches. Thus, there is no reaction of one of the strain gauges on any adjoining strain gauge connected in series with it. Both current sources should have good synchronous characteristics, which can be attained by symmetrical design and good heat coupling. For this purpose two strain gauges, which correspond to each other in both series circuits, are aligned in two pairs offset by 180 degrees along the same circumferential line of the measurement spring set axially and vertically. Both strain gauges of a third pair are aligned mutually offset by 180 degrees and they together are aligned offset 90 degrees relative to the preceding pair in the axial direction. Two strain gauges of a fourth pair are arranged one on top of the other oriented at one point by plus/minus 45 degrees to the axis.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A multi-component force and torque measurement cell of the type having a plurality of strain gauges connected to form half-bridge circuits with a constant current source in each branch and being oriented on a measurement spring with a defined force introduction for longitudinal and transverse forces and torques relative to the strain directions of the measurement spring and deriving a clearly correlated response in reference to the forces and torques, said cell having an adequate number of strain gauges so that using the measured voltage tapped at the half-bridge circuits and the standardized elongation effects of the forces or torques impacting the corresponding strain gauges an adequate number of equations can be generated to determine all forces and torques, comprising 2n+2 (n=non-zero integer number) strain gauges subdivided into two series circuits each incorporating half the number of strain gauges and a constant current source which are further connected to each other at both ends and to the ground so that measured voltages can be tapped between sequentially corresponding connecting points of strain gauges immediately adjoining each other in both series circuits.

2. A multi-component force and torque measurement cell in accordance with claim 1, wherein two corresponding strain gauges in both series circuits are offset from each other by 180 degrees in two pairs along the same circumferential line of the measurement spring and, respectively aligned axially and vertically thereto, wherein two strain gauges of a third pair are offset mutually by 180 and 90 degrees against the preceding pairs, and wherein both strain gauges of a fourth pair are arranged atop one another at one point at ±45 degrees to a longitudinal axis.

* * * * *